US005560583A

United States Patent [19]

Holmgren

[11] Patent Number: 5,560,583

[45] Date of Patent: Oct. 1, 1996

[54] APPARATUS FOR SUPPORTING AND POSITIONING EQUIPMENT

[75] Inventor: Ambjörn Holmgren, Lycksele, Sweden

[73] Assignee: Plymovent Aktiebolag, Lycksele, Sweden

[21] Appl. No.: 104,061

[22] PCT Filed: Jan. 28, 1992

[86] PCT No.: PCT/SE92/00051

§ 371 Date: Nov. 1, 1993

§ 102(e) Date: Nov. 1, 1993

[87] PCT Pub. No.: WO92/14561

PCT Pub. Date: Mar. 9, 1992

[30] Foreign Application Priority Data

Feb. 13, 1991 [SE] Sweden .............................. 91004234

[51] Int. Cl.[6] .............................. F16M 13/00

[52] U.S. Cl. .................. 248/652; 245/289.11; 245/550; 245/75; 245/81

[58] Field of Search .............................. 248/651, 652, 248/664, 669, 289.11, 299.1, 186, 278.1, 550, 75, 81, 280.1; 403/81, 161, 162, 157; 16/342, 353

[56] References Cited

U.S. PATENT DOCUMENTS

| | | | |
|---|---|---|---|
| 3,096,933 | 7/1963 | Bora | 248/186 X |
| 3,576,988 | 5/1971 | Henning | 248/289.1 X |
| 4,185,801 | 1/1980 | Plymoth | 248/289.1 |
| 4,307,672 | 12/1981 | Shikmi | 248/289.1 X |
| 4,541,327 | 9/1985 | Lundström | 248/278 X |
| 4,886,237 | 12/1989 | Dennis | 248/289.1 |
| 4,998,693 | 3/1991 | Wiebe | 248/278 X |

FOREIGN PATENT DOCUMENTS

| | | | |
|---|---|---|---|
| 423059 | 4/1982 | Sweden . | |
| 435240 | 9/1984 | Sweden . | |
| 1516083 | 10/1989 | U.S.S.R. | 248/75 |

*Primary Examiner*—Karen J. Chotkowski
*Attorney, Agent, or Firm*—Dvorak and Traub

[57] ABSTRACT

An arm (2) on which to mount an extractor and other equipment, the arm (2) is hinged by its inner end (9) to a support (17) with the intermediary of a mounting bracket (14), so as to be allowed to pivot essentially in the horizontal plane. A retaining device (18) acts between the arm (2) and the mounting bracket (14) to retain the arm in the set pivotal position. The retaining device (18) includes a rod (24) which carries friction washers (23) and which may be actuated by an actuator (20) via a rotationally mounted yoke (38) in order to move the friction washers (23) from their retaining frictional engagement with a plate (34) connected to the mounting bracket (14) and thereby allow the arm (2) to be pivoted as desired. The power actuator (20) is remote-controlled by a control unit positioned on the extraction hood of the extractor.

15 Claims, 3 Drawing Sheets

APPARATUS FOR SUPPORTING AND POSITIONING EQUIPMENT

The subject invention concerns an arrangement in extractor cranes comprising an arm arranged to mount an extractor and/or some other equipment, said arm being articulated by means of one of its arms to a support with the intermediary of a mounting bracket, so as to be allowed to pivot or swing essentially in the horizontal plane, a retaining device acting between the arm and the bracket or the support for the purpose of maintaining the arm in the set position of pivot thereof.

A device of the kind referred to is generally known from SE, C, 7706374-1, corresponding to SE, B, 423 059.

With the prior-art device it is necessary, when the extractor or other piece of equipment is to be mounted on or suspended from the pivotable arm, to exert a braking force on the ball-bearing mounted joint in the bracket with the aid of a braking element. This braking element is adjustable so as to allow regulation of the frictional force. However, the pressure required to prevent unintentional pivotal movement of the arm is quite considerable.

The disadvantages found in this prior-art device are, primarily, that the operator needs to exert considerable force in order to be able to pivot the arm against the action of the frictional force, and secondly, that the frictional force will change as the braking element wears out from use, with consequential need for resetting.

In order to obviate these and other disadvantages, the subject invention proposes to fit the retaining device with a retaining element which is actuated by means of a power actuator arranged, by overriding the retaining force, to allow the desired pivotal movement of the arm, and to provide for remote control of the actuator from a place spaced from said one end of the arm.

Figure 1:
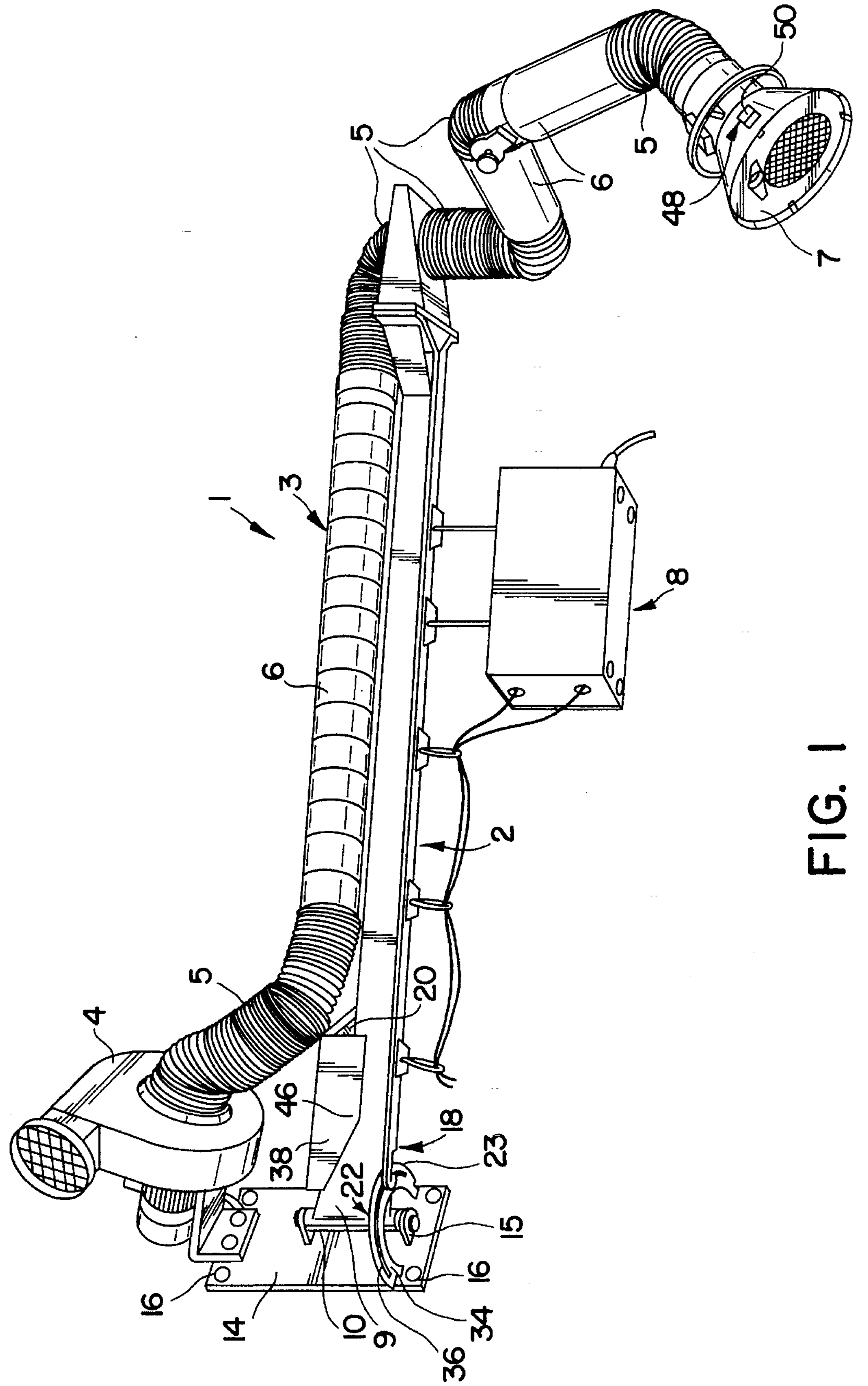
Figure 2:
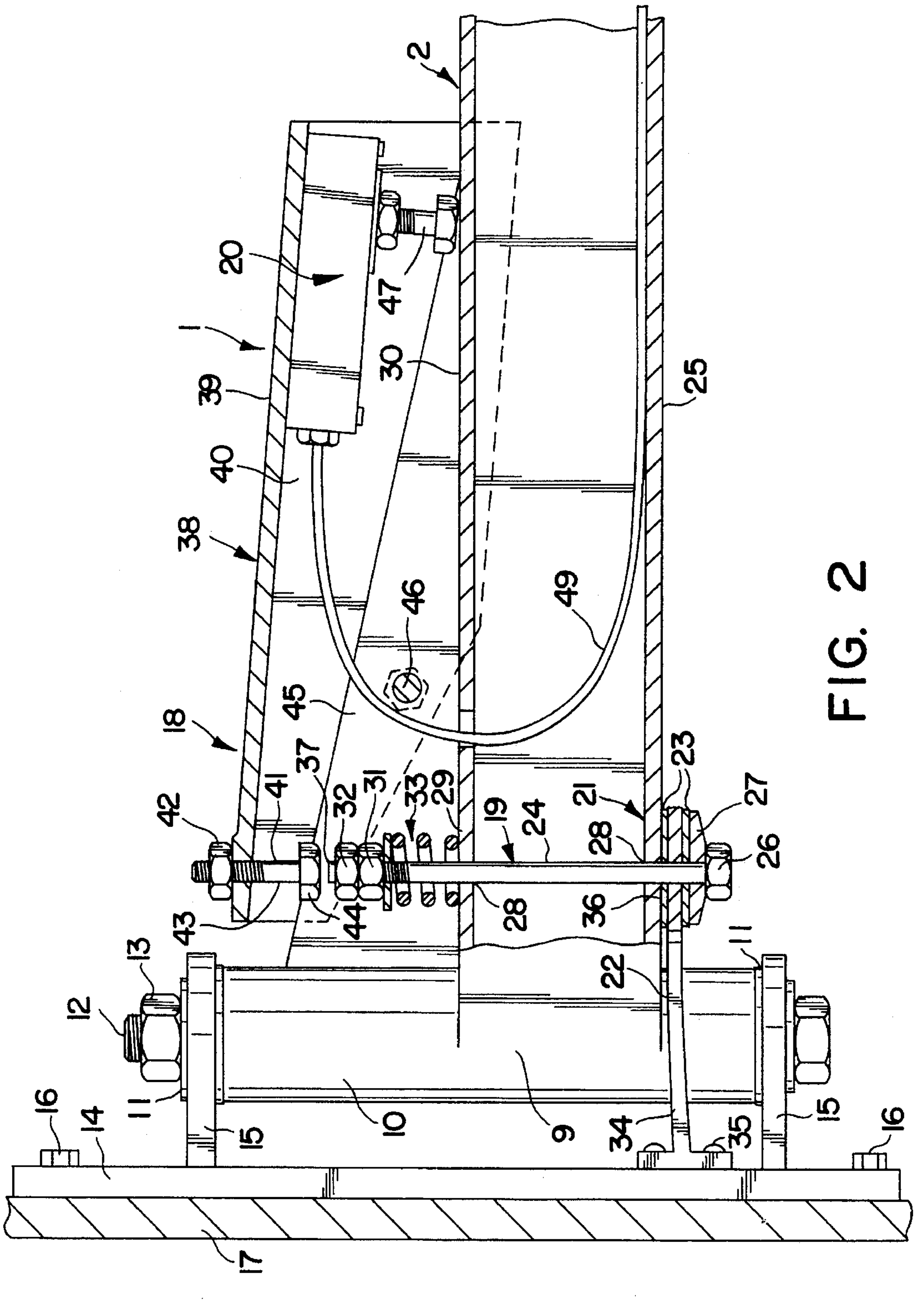
Figure 3:
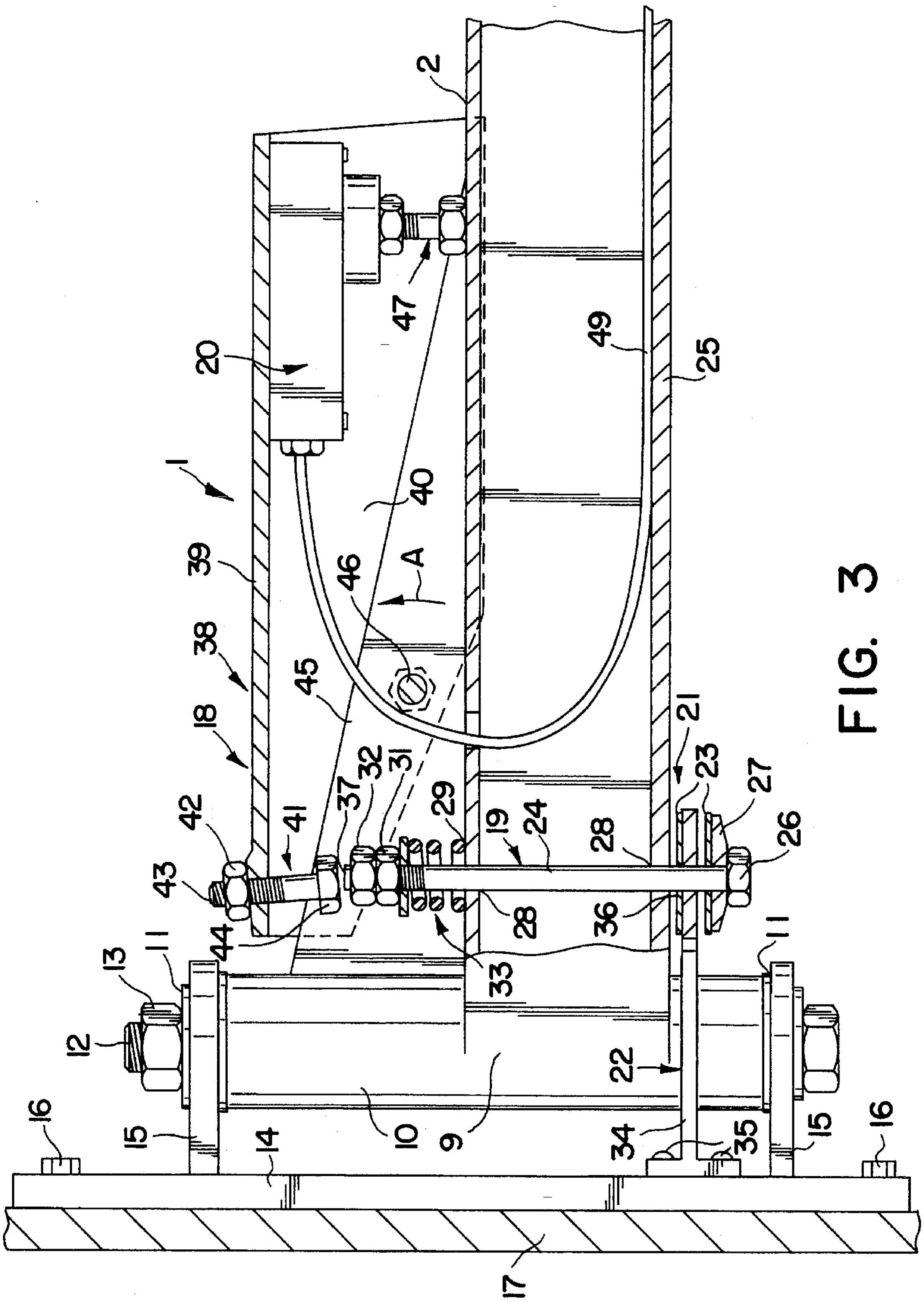

The invention will be described in closer detail in the following with reference to the accompanying drawings, wherein FIG. 1 is a perspective view obliquely from below of an extractor crane, and FIGS. 2 and 3 illustrate in respectively a lateral view and a longitudinal sectional view one end of an arm incorporated in the extractor crane of FIG. 1 and a retaining device cooperating therewith.

The extractor crane illustrated in the drawing figures and generally designated by reference 1 is fitted with an essentially horizontally directed arm 2 of a suitable material, preferably a tubular steel section. The arm 2 may be a one-piece section, as illustrated, or consist of two or several mutually articulated sections, depending on the desired range of the extractor crane 1.

The arm 2 is arranged to serve as a support or a suspension means for a fume extractor 3 of a prior-art design including a fan 4, hoses 5, tubes 6, and a hood 7 for extraction of the air-polluting substances (welding fumes) that are generated for instance during welding operations, and/or optionally for other equipment, such as welding-wire feeders 8, cables, hand tools and the like.

At one 9 of its ends the arm 2 is fitted with a vertically directed bearing tube 10, preferably secured to the arm through welding, which bearing tube 10 encloses and by means of suitable bearings 11 is mounted on a vertically directed spindle 12, thus allowing pivotal movements of the arm 2 essentially in the horizontal plane. Nuts 13 or similar means secure the spindle 12 non-rotationally between two vertically spaced and horizontally projecting lugs 15 which are secured, preferably through welding, to a mounting bracket 14. In accordance with the embodiment illustrated in the drawings, the mounting bracket 14 consists of a flat plate which by means of bolts 16 or similar fasteners extending through holes made in the plate, may be mounted on a support 17, preferably a wall, a stanchion or the like.

In order to retain the arm 2 of the extractor crane 1 together with the equipment 3, 8 mounted thereon in the desired angular position in which it is set, a retaining device, generally designated by reference 18, is arranged so as to act between said one end 9 of the arm 2 and, in the embodiment illustrated, the bracket 14.

Generally speaking, the retaining device 18 comprises a retaining element 19 which is arranged to be actuated by a power actuator 20 for the purpose of overriding the retaining force, thus allowing the arm 2 to be pivoted as desired. The power actuator 20 is remote-controlled from a point to be described in closer detail in the following, spaced from the said one end 9 of the arm 2.

More precisely, the retaining element 19 is equipped with a friction element 21 which is arranged to be displaced inside the arm 2 at the said one end 9 thereof and which is arranged to be actuated by the actuator 20 into and out of frictional engagement with a back-up or counter element 22 connected with the bracket 14.

In accordance with the embodiment illustrated, the friction element 21 consists of two circular friction washers 23 disposed at one, the lower, end of a rod 24 so as to sandwich the back-up element 22 between them. The upper friction washer 23 is situated between the lower face 25 of the arm 2 and the upper face of the back-up element 22 whereas the lower friction washer 23 is situated between the lower face of the back-up element 22 and a support washer 27 mounted in abutment against a head 26 of the rod 24.

The rod 24 is made from metal and forms part of the retaining element 19. In the manner illustrated, the rod 24 extends in an essentially vertical direction and is displaceable lengthwise, through the arm 2, through holes 28 formed in the latter, the said lower end of the rod 24 which supports the friction washers 23 and the support washer 27, projecting below the lower face 25 of the arm 2.

Intermediate its ends, the rod 24 supports a spring means 33 which is inserted on the rod 24 between an abutment 29 on the arm 2, in the subject case formed by the upper face 30 of the arm 20, and a set nut 31 and its associated tightening nut 32. In accordance with the embodiment illustrated, the spring means 33 is designed as a helical compression spring but it could equally well be in the form of two or more cup springs, a rubber spring or the like.

The back-up element 22 in accordance with the embodiment illustrated is designed as a crescent-shaped plate 34 which is positioned below the arm and which is attached at its free ends to the bracket 14 by means of bolts 35 or similar fastening means so as to project essentially horizontally away from the bracket 14.

The plate 34 could be given another configuration than the crescent-shape but irrespective of its configuration it is formed with an arcuate slit 36 having a radius the centre of which essentially coincides with the pivot centre of the arm 2 about the spindle 12. The lower end of the rod 24 on which end the friction washers 23 and the support washer 27 are mounted, extends through the slit 36 with the friction washers 23 positioned one on either side of the plate 34.

As appears from the drawing figures, the spring means 33 urges the friction washers 23 into engagement with the upper and lower faces of the plate 34 in order to provide the retaining effect, whereby the retaining force, i.e. the friction force between the friction washers 23 and the plate 34, may be set by adjusting the spring force by setting the set nut 31.

The upper free end 37 of the rod 24 may be actuated by the actuator 20 in order to effect disengagement of the friction washers 23 from the upper and lower faces of the plate 34 against the action of the spring means 33 in order to override the retaining force.

In accordance with the illustrated and preferred embodiment of the invention, the actuator 20 is mounted at one end of a double-arm yoke 38, which is made of sheet metal and which has a cross-sectional configuration essentially in the form of an inverted U comprising an upper web 39 and two downwardly directed lateral flanges 40.

At the opposite end of the yoke 38, in alignment with the previously mentioned second, upper end 37 of the rod 24, the yoke is fitted with an actuating means 41 which is mounted in the yoke web 39. The actuating means is in the form of a bolt 43 with a locking nut 42 and is screwed into the yoke web, and the bolt head 44 may be displaced into engagement with the upper end 37 of the rod 24 for actuation thereof, as will be described in closer detail in the following.

A pivot through-pin 46 intermediate the yoke ends pivotally mounts the yoke 38 via the lateral flanges of the latter, to reinforcement flanges 45 formed on the arm 2 of the extractor crane 1 to allow pivotal movement of the yoke about an essentially horizontal axis.

For this purpose, the actuator 20 is fitted with an actuating element 47 on its side facing the arm 2, which actuating element is arranged to move lengthwise or outwards and inwards and which upon remote control of the actuator 20 moves outwards and into engagement with the upper face 30 of the arm 2 in order to turn the yoke 38 counter-clockwise A about the pivot 46, thus displacing, via the actuating means 41, the rod 24 of the retaining element 19 downwards against the action of the spring means 33 with consequential disengagement of the friction washers 23 from the plate 34.

The remote control of the actuator 20 already referred to is effected by means of an appropriate control unit 48 which in accordance with the embodiment illustrated is positioned at the free end of the extractor crane 1, so as to be easily accessible to the crane operator. In this case, the control unit 48 preferably is positioned on or adjacent the extraction hood 7 of the extractor 3. However, the control unit 48 may be positioned elsewhere, remote from the retaining device 18 and may for instance be carried by the operator and be connected to the retaining device in a wireless mode or by means of cables.

The actuator 20 proper may be designed in a variety of different ways. In accordance with one embodiment it consists of a pneumatic cylinder and in accordance with another of a hydraulic cylinder, the cylinder piston rod preferably forming the actuating element 47. According to a third alternative, it consists of an electro-magnet with a displaceable armature, the latter in this case preferably forming the actuating element 47. Further alternative embodiments of the actuator 20 obviously are possible, the essential feature being the ability of the actuator to pivot the yoke in the manner described above.

Independently of the design and nature of the actuator 20 the control unit 48 may consist of a pneumatic or hydraulic valve, a switch or a similar means connected to the actuator 20 via supply lines 49 for pressurized air, hydraulic fluid, electricity etcetera.

To allow the operator to remote control the actuator 20 from the control unit 48 the latter includes a manually operable control element 50 of a suitable type, such as a control lever, a push button or the like.

In order to supply the actuator 20 and the control unit with the required energy (pressurized air, hydraulic fluid, electricity and so on) the actuator 20 is connected in any suitable manner to an external source of energy, not shown.

The invention must not be regarded as limited to the embodiment described herein and illustrated on the accompanying drawings but may be modified in many ways within the scope of the appended claims.

For instance, in accordance with an alternative embodiment, the yoke 38 may be dispensed with and the actuator 20 be arranged to act directly, by means of its actuating element 47, on the rod 24 of the retaining device 18 or even form the rod, in which case the actuator is rigidly mounted on the arm 2.

In accordance with further embodiments, the retaining device 18 and the actuator 20 may constitute a unit in the form of e.g. a horizontally directed piston- and cylinder unit the cylinder of which is hinged to the bracket 14 and the piston rod of which to the arm 2 or vice versa, in order to pivot and retain, respectively, the arm in the set position of pivotement, or a rotational motor the output shaft of which is connected to or forms part of the bearing tube 10 to turn and retain the latter, respectively, and thus to effect pivotal movement and retainment of the arm in the set pivotal position.

I claim:

1. An apparatus for extractor cranes, the apparatus comprising an arm arranged to mount an extractor, said arm having a pair of ends and an upper and lower face, one end pivotably coupled to a support with a mounting bracket, a retaining device for applying a retaining force to retain the arm in a set position relative to said support, the retaining device having a friction element in the form of at least one friction washer in frictional engagement with a counter-element coupled to one of the bracket and the support, and a friction retaining element, the retaining device actuatable by means of an actuator in order to displace the friction element into and out of frictional engagement with the counter-element by overriding the retaining force, which allows the arm to be pivoted to another position, the actuator being controllable by a remote control unit, wherein said friction retaining element is comprised of a vertically disposed rod extending through said arm and said counter-element, a spring means for downwardly displacing said rod, and a friction adjustment means disposed on said rod, said rod having an upper end, a lower end, and an intermediate section, with said spring means disposed about said intermediate section and in resting contact on said upper face of said arm such that said rod extends therethrough, said adjustment means located on said upper end of said rod and said lower end of said rod supporting said friction washer.

2. An apparatus as claimed in claim 1, wherein the actuator (20) is arranged at one end of a yoke (38) the opposite end of which is formed with an actuating means (41) in alignment with said other end (37) of the rod (24), said yoke being pivotally mounted to the arm (2) intermediate its ends so as to be able to pivot about an essentially horizontal axis, said actuator (20) being formed with an actuating element (47) which is movable lengthwise and which upon remote control of the actuator (20) may be moved into abutment against the upper face (30) of the arm (2) in order to pivot the yoke (38) and to thus displace the rod (24) downwards via the actuating means (41) against the action of the spring means (33) with consequential disengagement of the friction washer (23) from engagement with the plate (22).

3. An apparatus as claimed in claim 1, wherein the remote control of the actuator (20) is effected by means of the control unit (48) positioned at an opposite free end of the arm (2) so as to be easily accessible to an operator.

4. An apparatus as claimed in claim 1, wherein the actuator (20) is connected to an external source of energy.

5. An apparatus as claimed in claim 1, wherein the counter-element is in the form of a plate positioned below the arm and having an arcuate, essentially horizontally directed slit the radius of which has its center positioned essentially in the pivot center of the arm, said one end of the rod extending through the slit with the friction washer positioned on the lower face of the plate.

6. An apparatus as claimed in claim 1, wherein the counter-element is in the form of a plate positioned below the arm and having an arcuate, essentially horizontally directed slit the radius of which has its center positioned essentially in the pivot center of the arm, said one end of the rod extending through the slit with the friction washer positioned on the lower face of the plate.

7. An apparatus as claimed in claim 1, wherein the spring element urges the friction washer into engagement with the counter-element for retaining purposes, and in that the rod is arranged to be actuated at its opposite end by the actuator in order to disengage, against the action of the spring means, the friction washer from engagement with the plate in order to override the retaining force.

8. An apparatus as claimed in claim 1, wherein the actuator is arranged at one end of a yoke the opposite end of which is formed with an actuating means in alignment with said other end of the rod, said yoke being pivotally mounted to the arm intermediate its ends so as to be able to pivot about an essentially horizontal axis, said actuator being formed with an actuating element which is moveable lengthwise and which upon remote control of the actuator may be moved into abutment against the upper face of the arm in order to pivot the yoke and to thus displace the rod downwards via the actuating means against the action of the spring means with consequential disengagement of the friction washer from engagement with the counter-element.

9. An apparatus as claimed in claim 1, wherein remote control of the actuator is effected by means of the control unit positioned at the opposite free end of the arm on or adjacent an extraction hood fitted on the arm.

10. An apparatus as claimed in claim 1, wherein remote control of the actuator is effected by means of the control unit positioned at the opposite free end of the arm on or adjacent an extraction hood fitted on the arm.

11. An apparatus as claimed in claim 1, wherein the actuator is connected to an external source of energy.

12. An apparatus for supporting and positioning equipment, the apparatus comprising:

an arm from which equipment may be supported, the arm having one end pivotably coupled to a support;

a counter-element coupled to the support, wherein the arm is pivotable in relation to the counter-element, wherein the counter-element is comprised of a plate with an arcuate surface, the arcuate surface having an arcuate slot formed therein;

an actuatable retaining element disposed on the arm, the retaining element having a friction element frictionally engageable with the counter-element to fixedly retain the arm in a set position in relation to the counter-element the actuatable retaining element comprised of a rod extending between the arm and the arcuate surface of the plate, the rod extending through the arcuate slot; and an actuator for actuating the actuatable retaining element to disengage the friction element from frictional engagement with the counter-element so that the arm may be pivoted to another position in relation to the counter-element, wherein the friction element is disposed on the rod and biased in frictional engagement with a lower surface of the plate to fixedly retain the arm in a set position in relation to the plate.

13. The apparatus of claim 12, wherein the rod extends through a portion of the arm and through the arcuate slot in the plate, the friction element disposed on a portion of the rod extended through the arcuate slot and biased in frictional engagement with the lower surface of the plate by a spring force applied to a portion of the rod extending above the arm, the actuator applying a force on the rod to extend the rod against the bias of the spring force to disengage the friction element from frictional engagement with the lower surface of the plate so that the arm may be pivoted to another position in relation to the plate, the actuator actuatable by a remote actuation unit.

14. An apparatus as claimed in claim 13, wherein the actuator is arranged at one end of a yoke the opposite end of which is formed with an actuating means in alignment with said rod, said yoke being pivotally mounted to the arm intermediate its ends so as to be able to pivot about an essentially horizontal axis, said actuator being formed with an actuating element which is moveable lengthwise and which upon remote control of the actuator may be moved into abutment against the upper face of the arm in order to pivot the yoke and to thus displace the rod downwards via the actuating means against the action of the spring force with consequential disengagement of the friction element from engagement with the plate.

15. An apparatus for extractor cranes, the apparatus comprising an arm arranged to mount an extractor, said arm having a pair of ends and an upper and lower face, one end pivotably coupled to a support with a mounting bracket, said pivoted end defining a pivot center of said arm, wherein said arm is allowed to pivot in a horizontal direction, a retaining device for applying a retaining force to retain the arm in a set position relative to said support, the retaining device having a friction element in frictional engagement with a counter-element coupled to one of the bracket and the support, and a retaining element, the retaining device being actuatable by means of an actuator to displace the friction element into and out of the retaining frictional engagement with the counter-element, by overriding the retaining force which allows the arm to be pivoted to another position, the actuator being controllable by a remote control unit, wherein the retaining element is comprised of a rod having a spring element disposed thereon, I said counter-element in the form of a horizontally disposed plate positioned below said arm and having a radial slit therein, said slit having a center coextensive with said pivot center of said arm, said lower end of said rod extending through said slit, with the friction washer positioned on a lower face of the plate and wherein the spring element urges the friction washer into engagement with said lower face of the plate for retaining purposes, said rod arranged to be actuated at said upper end by said actuator in order to disengage, against an action of the spring means, the friction washer from engagement with said plate, thereby overriding the retaining force, wherein the actuator is formed with a means for actuating said upper end of said rod, said actuator mounted on a yoke pivotably mounted on said arm intermediate said ends so as to be vertically pivotable with respect to said arm, said actuator having an actuating element vertically movable into abutting contact against said upper face of said arm in order to pivot said yoke, thereby displacing said rod downwardly via said actuating means, pushing said spring means downwardly, whereby said friction washers disengage from said plate.

* * * * *